US005499149A

United States Patent [19]
Dovek

[11] Patent Number: 5,499,149
[45] Date of Patent: Mar. 12, 1996

[54] SLIDER WITH TRANSVERSE RIDGE SECTIONS SUPPORTING AIR-BEARING PADS AND DISK DRIVE INCORPORATING THE SLIDER

[75] Inventor: Moris M. Dovek, San Carlos, Calif.

[73] Assignee: International Business Machines Corporation, Armonk, N.Y.

[21] Appl. No.: 422,728

[22] Filed: Apr. 13, 1995

Related U.S. Application Data

[63] Continuation-in-part of Ser. No. 102,031, Aug. 3, 1993, Pat. No. 5,418,667.

[51] Int. Cl.⁶ .................................................... G11B 5/60
[52] U.S. Cl. .................................................... 360/103
[58] Field of Search ............................................ 360/103

[56] References Cited

U.S. PATENT DOCUMENTS

| | | | |
|---|---|---|---|
| 2,969,435 | 1/1961 | Lynott | 179/100.2 |
| 3,005,675 | 10/1961 | Ledin et al. | 346/74 |
| 3,060,431 | 10/1962 | Fuller et al. | 346/74 |
| 3,754,104 | 8/1973 | Piper et al. | 17/100.2 P |
| 4,167,765 | 9/1979 | Watrous | 360/103 |
| 4,633,351 | 12/1986 | Bardos et al. | 360/102 |
| 4,644,641 | 2/1987 | Verdone | 29/603 |
| 4,819,091 | 4/1989 | Brezoczky et al. | 360/97.01 |
| 4,901,185 | 2/1990 | Kubo et al. | 360/104 |
| 5,021,906 | 6/1991 | Chang et al. | 360/103 |
| 5,097,368 | 3/1992 | Lemke et al. | 360/97.02 |
| 5,193,046 | 3/1993 | Lemke et al. | 360/97.02 |
| 5,200,867 | 4/1993 | Albrecht et al. | 360/103 |
| 5,267,104 | 11/1993 | Albrecht et al. | 360/97.02 |
| 5,267,109 | 11/1993 | Chapin et al. | 360/103 |
| 5,309,303 | 5/1994 | Hsia et al. | 360/103 |
| 5,327,310 | 7/1994 | Bischoff et al. | 360/103 |
| 5,418,667 | 5/1995 | Best et al. | 360/103 |

FOREIGN PATENT DOCUMENTS

| | | |
|---|---|---|
| 2010836 | 8/1990 | Canada . |
| 0367510 | 5/1990 | European Pat. Off. . |
| 1557205 | 1/1969 | France . |
| 52-104117 | 9/1977 | Japan . |
| 52-029111 | 3/1978 | Japan . |
| 53-095010 | 8/1978 | Japan . |
| 60-202538 | 10/1985 | Japan . |
| 61-48182 | 3/1986 | Japan . |
| 61-000962 | 6/1986 | Japan . |
| 62-189685 | 8/1987 | Japan . |
| 2-50376 | 2/1990 | Japan . |
| 2229852 | 10/1990 | United Kingdom . |
| 86-03048 | 5/1986 | WIPO . |

OTHER PUBLICATIONS

M. Ichinose et al., "Single-crystal Ferrite Technology for Monolithic Disk Heads", IEEE Transactions on Magnetics, vol. 26, No. 6, Nov. 1990, pp. 2972–2977.

*Primary Examiner*—Robert S. Tupper
*Attorney, Agent, or Firm*—Thomas R. Berthold

[57] ABSTRACT

A data recording disk drive has an improved head-disk interface provided by a transducer carrier which is essentially a low-flying air-bearing slider that is also able to be in contact and near contact with the lubricant film on the disk. The slider has a front air-bearing surface in the form of a pair of equally-spaced air-bearing pads, a rear air-bearing pad, and a central nonair-bearing recessed surface which separates the front and rear air-bearing pads. The two front pads have a surface area greater than that of the rear pad and thus provide a positive pitch up of the slider. This causes the rear pad to also be pitched up so that air can flow beneath the rear pad to generate an air bearing in the rear portion of the slider. The presence of the central nonair-bearing region eliminates any lift in the central part of the slider, which allows for the low-flying height. The flying height of the rear pad of the slider above the disk is controlled by the width of the rear air-bearing pad. The rear pad has its leading edge wider than its trailing edge so that it is able to withstand contact with the lubricant film on the disk, typically at the lower disk velocities near the disk inside diameter, without generating unacceptable drag forces or depleting the lubricant from the disk. The rear pad also has a skewed leading edge which compensates for skew of the slider to minimize the flying height variation from the disk inside diameter to outside diameter.

20 Claims, 5 Drawing Sheets

SLIDER WITH TRANSVERSE RIDGE SECTIONS SUPPORTING AIR-BEARING PADS AND DISK DRIVE INCORPORATING THE SLIDER

This application is a continuation-in-part of application Ser. No. 08/102,031, filed Aug. 3, 1993, now U.S. Pat. No. 5,418,667.

TECHNICAL FIELD

This invention relates to data recording disk drives, and more particularly to a disk drive having an improved transducer carrier at the head-disk interface.

BACKGROUND OF THE INVENTION

Disk drives, also called disk files, are information storage devices that use a rotatable disk with concentric data tracks containing the information, a head or transducer for reading and/or writing data onto the various tracks, and an actuator connected to a carrier for the head for moving the head to the desired track and maintaining it over the track centerline during read or write operations. There are typically a plurality of disks separated by spacer rings and stacked on a hub that is rotated by a disk drive motor. A housing supports the drive motor and head actuator and surrounds the head and disk to provide a substantially sealed environment for the head-disk interface.

In conventional magnetic recording disk drives, the head carrier is an air-bearing slider that rides on a bearing of air above the disk surface when the disk is rotating at its operational speed. The slider is maintained next to the disk surface by a relatively fragile suspension that connects the slider to the actuator. The slider is either biased toward the disk surface by a small spring force from the suspension, or is "self-loaded" to the disk surface by means of a "negative-pressure" air-bearing surface on the slider. Contact start/stop (CSS) disk drives operate with the slider in contact with the disk surface during start and stop operations when there is insufficient disk rotational speed to maintain the air bearing. In contrast to CSS disk drives, "load/unload" disk drives mechanically unload the slider from the disk when the power is turned off, typically by means of a ramp which contacts the suspension when the actuator is moved, and then load the slider back to the disk when the disk has reached a speed sufficient to generate the air bearing. Both types of disk drives maintain a relatively thin lubricant film on the disk surface to prevent damage to the head and disk caused by any contact between the head and disk.

It has been known since the early days of magnetic recording that minimizing the head-disk spacing is desirable because the amplitude of the read signal from the disk increases with decreasing head-disk spacing. Higher recording densities can thus be achieved. In conventional, commercially available air-bearing disk drives the minimum achievable head-disk spacing is typically between 1000–2000 Angstroms. In addition, this spacing is not maintained constant, but varies with disk radius because the air velocity beneath the air-bearing slider is directly proportional to the relative velocity of the disk beneath the slider. To both minimize the head-disk spacing and to maintain it constant with disk radius, liquid bearings have been proposed as possible alternatives to the conventional air bearing at the head-disk interface in magnetic recording disk drives. For example, in assignee's pending application, U.S. Ser. No. 264,604, filed Oct. 31, 1988, and published May 9, 1990, as European published application EP 3675 10, a disk drive is described which uses a continuously recirculating, low-viscosity liquid lubricant which is maintained as a relatively thick layer on the disk, and a transducer carrier that has triangular-shaped feet to plow through the low-viscosity liquid layer. The EP 3675 10 reference suggests that a head-disk spacing of approximately 500 Angstroms can be obtained with a liquid film having a thickness of approximately 10,000 Angstroms. Similarly, in U.S. Pat. No. 5,097,368 assigned to Conner Peripherals, filed Dec. 20, 1989, and issued Mar. 17, 1992, a recirculating liquid-bearing disk drive is described in which a head-disk spacing of approximately 300–700 Angstroms can be achieved at the operating speed of a conventional air-bearing disk drive if a load of approximately 45 grams is applied to force the head carrier against the liquid bearing (see FIG. 6 of the '368 patent).

In U.S. Pat. No. 4,901,185 assigned to Toshiba, filed in the U.S. on Jul. 10, 1986, and issued Feb. 13, 1990, the problems of minimizing and maintaining constant the head-disk spacing are addressed by a disk drive which uses a combined air and liquid bearing to support the transducer carrier. An air-bearing slider provides support for the forward portion of the carrier while the rear portion, which includes the magnetic head, contacts and is supported by a conventional liquid lubricant film. The '185 patent suggests that a head-disk spacing of less than approximately 800 Angstroms can be achieved using a lubricant film of greater than approximately 200 Angstroms thickness.

More recently, in assignee's U.S. Pat. No. 5,202,803, filed Jul. 2, 1991, and issued Apr. 13, 1993, a disk drive is described in which a conventional nonrecirculating, high-viscosity lubricant film is maintained on the disk and the transducer carrier is a modified three-rail air-bearing slider that has a rear "ski" pad. When the disk drive reaches operating speed, the air-bearing effect of the slider rails provides the primary support for the carrier, while the rear ski pad, which supports the magnetic head, contacts the lubricant film. The thickness of the lubricant film on the disk is approximately 20–100 Angstroms, which would also be the approximate head-disk spacing between the rear pad and the disk surface, assuming a perfectly smooth disk surface.

While liquid-bearing disk drives present the opportunity for closer head-disk spacing than air-bearing disk drives, they also present several difficulties. The carrier must provide a low-static friction ("stiction") interface when the carrier is at rest on the disk because liquid-bearing disk drives have thicker lubricant films and smoother disks than air-bearing disk drives. The carrier must also be designed to create small drag through the liquid film and to minimize liquid depletion from the disk. In addition, the carrier must be able to perform adequately over a wide range of relative carrier-disk velocities which occur at different disk radii.

What is needed is a disk drive with an improved head-disk interface that takes advantage of an air bearing to avoid the problems associated with liquid bearings, yet provides a head-disk spacing that is significantly less than even than achievable by a liquid bearing, and is less sensitive to variation with disk radius and to variations in head-carrier manufacturing parameters.

SUMMARY OF THE INVENTION

The invention is a disk drive having an improved head-disk interface provided by a transducer carrier that is essentially a low-flying, air-bearing slider designed to also function in contact and near contact with the lubricant film on the disk. The slider has a front air-bearing surface in the form of a pair of air-bearing pads, a rear centrally-located air-bearing pad, and a central nonair-bearing surface that separates the front and rear air-bearing pads. The two front pads have a surface area greater than that of the rear pad and thus provide a positive pitch up of the slider. This causes the rear pad to also be pitched up. This pitch, coupled with a step taper at the rear pad, permits air to flow beneath the rear pad to generate an air bearing in the rear portion of the slider. The presence of the central nonair-bearing region eliminates any lift in the central part of the slider, which allows for tight tolerances at the low-flying height. The flying height of the rear pad of the slider above the disk is controlled by the width of the rear air-bearing pad. The rear pad has its leading edge wider than its trailing edge so that it can withstand contact with the lubricant film on the disk, typically at the lower disk velocities near the disk inside diameter, without generating unacceptable drag forces or depleting the lubricant. The rear pad also has a skewed leading edge that compensates for skew of the slider to minimize the flying height variation from the disk inside diameter to outside diameter. In the preferred embodiment, the disk drive is a load/unload disk drive so that, under normal conditions, the slider does not contact the disk when the disk is not rotating.

For a fuller understanding of the nature and advantages of the present invention, reference should be made to the following detailed description taken together with the accompanying drawings.

DESCRIPTION OF THE INVENTION

Preferred Embodiment

Figure 1:
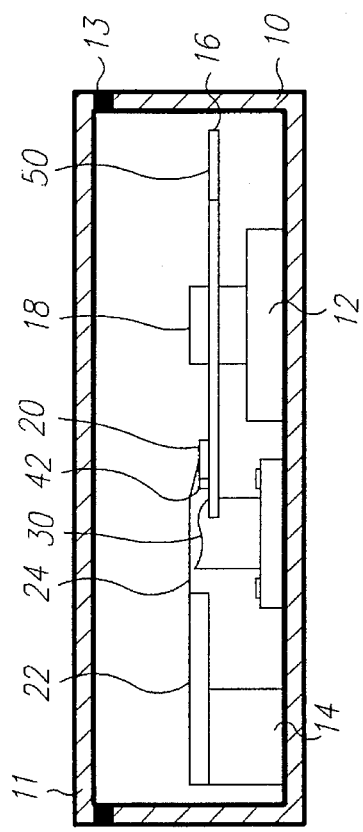
FIG. 1 is a view in section of a schematic of the disk drive of the present invention.

Referring first to FIG. 1, there is illustrated in sectional view a schematic of the disk drive according to the present invention. The disk drive comprises a base 10 to which are secured a disk drive motor 12 and an actuator 14, and a cover 11. The base 10 and cover 11 provide a substantially sealed housing for the disk drive. Typically, there is a gasket 13 located between base 10 and cover 11 and a small breather port (not shown) for equalizing pressure between the interior of the disk drive and the outside environment. This type of disk drive is described as being substantially sealed since the drive motor 12 is located entirely within the housing and there is no external forced air supply for cooling the interior components. A magnetic recording disk 16 is connected to drive motor 12 by means of hub 18 to which it is attached for rotation by the drive motor 12. A thin continuous film 50 of a relatively high-viscosity lubricant is maintained on the surface of disk 16. In the preferred embodiment, the lubricant is a conventional perfluoro-polyether (PFPE) disk lubricant, such as Demnum SP brand from Daikin, and is formed to a thickness of approximately 40 Angstroms. A read/write head or transducer 42 is formed on the trailing end of an air-bearing slider 20. Transducer 42 may be an inductive read and write transducer or an inductive write transducer with a magnetoresistive (MR) read transducer formed by thin film deposition techniques as is known in the art. The slider 20 is connected to the actuator 14 by means of a rigid arm 22 and a suspension 24, the suspension 24 providing a biasing force which urges the slider 20 onto the surface of the recording disk 16. During operation of the disk drive, the drive motor 12 rotates the disk 16 at a constant speed, and the actuator 14, which is typically a linear or rotary voice coil motor (VCM), moves the slider 20 generally radially across the surface of the disk 16 so that the read/write head may access different data tracks on disk 16.

Figure 2:
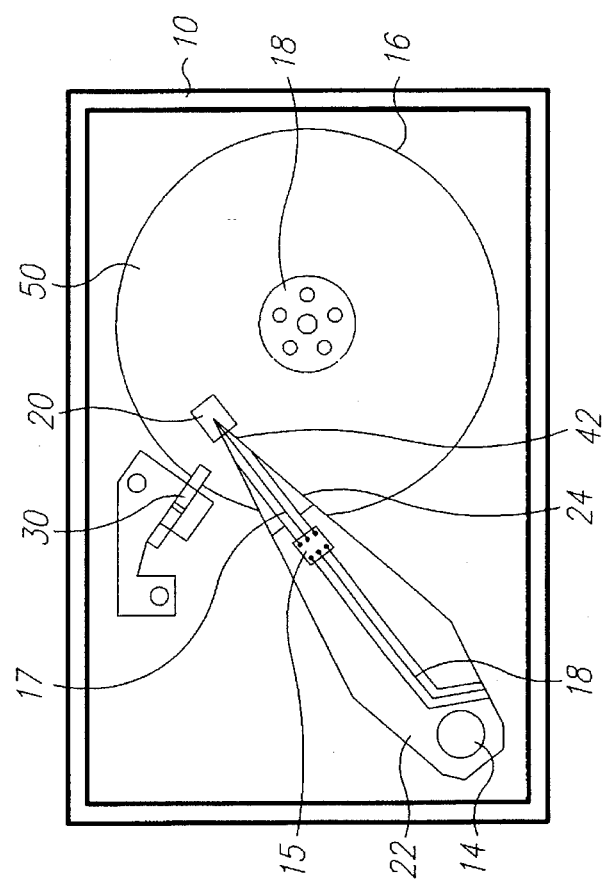
FIG. 2 is an open top view of the disk drive depicted schematically in FIG. 1.

FIG. 2 is a top view of the interior of the disk drive with the cover 11 removed, and illustrates in better detail the suspension 24 which provides a force to the slider 20 to urge it toward the disk 16. The suspension may be a conventional type of suspension such as the well-known Watrous suspension, as described in U.S. Pat. No. 4,167,765 assigned to IBM. This type of suspension also provides a gimbaled attachment of the slider which allows the slider to pitch and roll as it rides on the air bearing. In the preferred embodiment of the disk drive, a load/unload ramp 30 is mounted to the base 10. Ramp 30 contacts suspension 24 and lifts the slider 20 away from the disk 16 when the actuator 14 rotates the slider 20 toward the disk outside diameter when the disk drive is powered down. Examples of conventional types of load/unload ramps are described in U.S. Pat. Nos. 3,984,873 assigned to Information Storage Systems, Inc. (see FIG. 5), and 5,027,241 assigned to Quantum Corporation. The data detected from disk 16 by the transducer 42 is processed into a data readback signal by signal amplification and processing circuitry in the integrated circuit chip 15 located on arm 22. The signals from transducer 42 travel via flex cable 17 to chip 15, which sends its output signals via cable 19.

Figure 3:
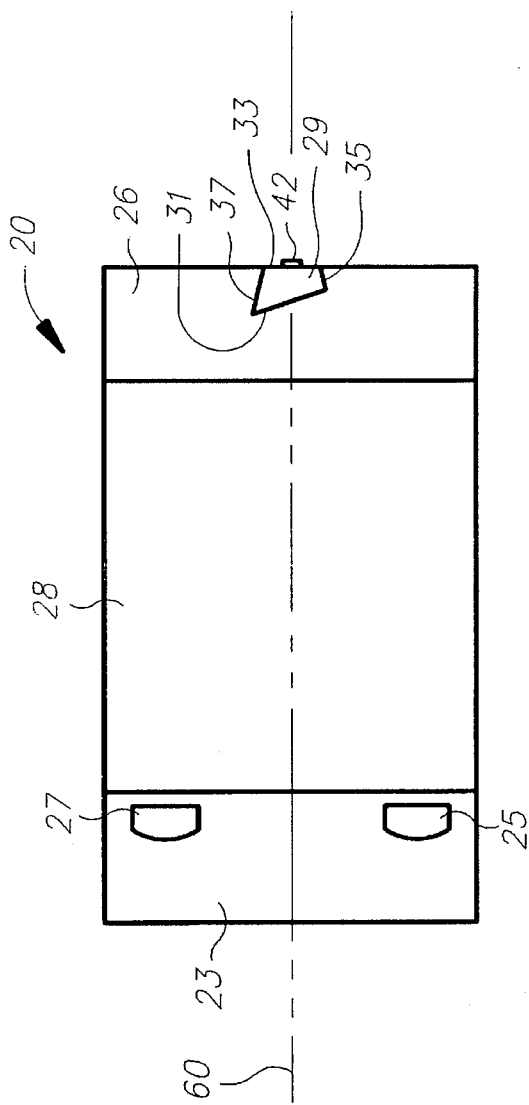
FIG. 3 is a plan view of the bottom or disk side of the preferred embodiment of the air-bearing slider of the present invention.
Figure 4:
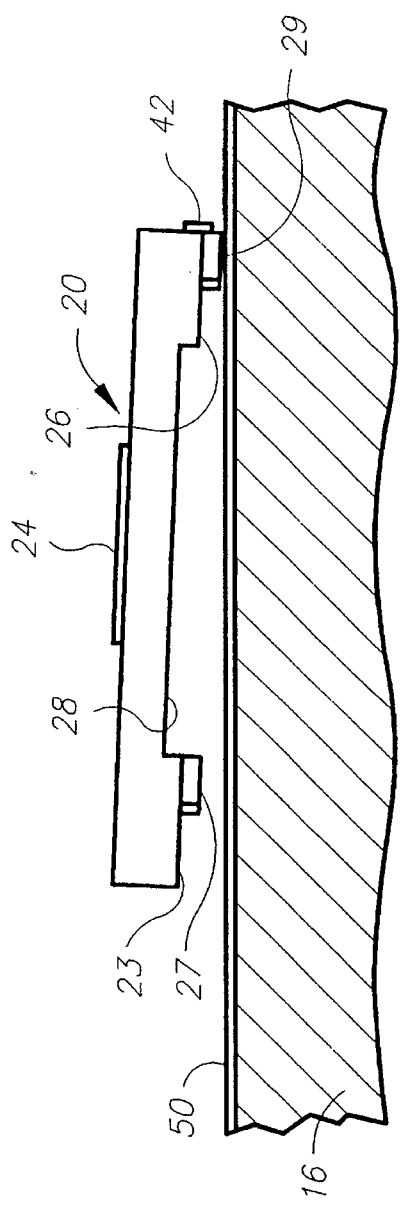
FIG. 4 is a sectional view of the slider-disk interface of the present invention illustrating the front and rear air-bearing pads and the intermediate nonair-bearing surface.

The bottom or disk side of slider 20 is shown in FIG. 3, and the side view of slider 20 in its air-bearing relationship with disk 16 and lubricant film 50 is shown in FIG. 4. The front air-bearing surface is a pair of air-bearing pads 25, 27 which provide the air-bearing effect to support the front end of slider 20 above the disk 16 when the disk is at its operational speed. The pads 25, 27 extend from a front ridge section 23 that acts as a step taper for the pads. The pads 25, 27 are generally equally spaced about the slider longitudinal centerline 60. The front pads 25, 27 have convex curved leading edges to minimize the air drag and to brush aside any particulate debris that may be present on the disk. A rear air-bearing pad 29 extends from a rear ridge section 26 that also acts as a step taper. Ridge sections 23, 26 are oriented generally parallel with each other and perpendicular to longitudinal centerline 60. The ridge sections 23, 26 are separated by a central nonair-bearing surface 28 which extends across the entire width of slider 20. The nonair-bearing surface 28 removes any air lift in that region of the slider 20, thus minimizing the total air lift on slider 20 and assuring that the front end is pitched up to enable air to flow under pitched-up rear pad 29.

The rear pad 29 has a leading edge 31 which is wider than its trailing edge 33. The sides 35, 37 of rear pad 31 are thus slanted relative to the length of the slider. In the preferred embodiment, the sides 35, 37 are angled approximately 20 degrees relative to the longitudinal axis of the slider. By making the rear pad 29 wider in the front than in the back, the rear pad 29 is prevented from acting as a plow, thereby minimizing depletion of the lubricant in the wake of movement of the disk 16 under the rear pad 29 during any contact of the pad 29 with the lubricant film 50. This also maintains low drag and minimizes thinning of the lubricant under the pad 31.

In disk drives with rotary actuators, the longitudinal axis of the slider is tangent to the disk at only one track position. For example, in one commercially available 2.5-inch disk drive the slider is skewed at approximately minus 4 degrees at the inside diameter (ID) and positive 17 degrees at the outside diameter (OD). By making the angle of the sides 35, 37 of rear pad 31 greater than the maximum absolute value of skew, for example approximately 20 degrees, it is assured that the rear pad remains nonplowing over the complete angle range of operation of the disk drive as the slider moves from disk ID to disk OD.

The rear pad 29 is also asymmetric in that its leading edge 31 is nonparallel or slanted relative to the trailing edge 33. This skewed leading edge provides extra air-bearing lift at the disk ID where the local disk velocity is low and less lift at the disk OD where the air-bearing effect is greater due to the higher local disk velocity.

As shown in FIG. 3, the total surface area of front air-bearing pads 25, 27 is greater than the surface area of rear pad 29. This feature, and the presence of the nonair-bearing surface 28 separating the two ridge sections 23, 26, results in a positive pitch up of the slider 20 (see FIG. 4) which causes rear pad 29 to also have a positive pitch, thereby enabling the air-bearing effect beneath pad 29 to support the rear portion of slider 20.

The area of the front pads 25, 27 and the depth of the step taper surface of ridge section 23 relative to the pads affect the slider-to-disk stiction, the flying height of the front pads, and the lift on the rear pad 29. The stiction has been found to be directly proportional to the area of the slider wetted by the lubricant from film 50 and inversely proportional to the separation between the slider and the disk, where "separation" is the distance from the disk to the part of the slider which is just wetted.

Since low stiction is desired, the area of the pads 25, 27 must be kept low in combination with a large depth of the surface of ridge section 23. However, the area of pads 25, 27 must also be sufficient to provide the positive pitch of the slider in operation. With the same pad area, different combinations of length-to-width ratio (L/W) of each of the pads 25, 27 can be used. ("Length" of the pads 25, 27 is the direction parallel to centerline 60.) It has been determined that as L/W increases for a given pad area, the total lift begins to decrease and thus L/W should not exceed approximately 2. If L/W is made too small, however, the slider loses roll stiffness, and the tolerances due to manufacturing variances become unacceptable. Thus, L/W should not be less than approximately 0.25.

The depth of the step taper surface of ridge section 23 must also be chosen with regard to flyability. For example, if this depth is too low, the lift will be too small and the pad area will have to be increased. It is also desirable to select a depth such that any change in the depth due to manufacturing tolerances will cause only a very small resulting change in the flying height of the front pads 25, 27. Taking these considerations into account, it has been determined that the depth must be greater than the flying height of the slider in the rear, and less than approximately 3 times the flying height of the slider in the front. For cases where the slider is designed to be in contact, the "flying height" becomes essentially the waviness and effective roughness of the disk.

In one experimental example the slider 20 was designed, by appropriate selection of suspension preload and air-bearing pad size and shape, to fly at the disk ID on a theoretically smooth disk with a spacing between the front pads 25, 27 and disk 16 of approximately 1000 Angstroms and a spacing between the rear pad 29 and disk 16 of approximately 100 Angstroms. The leading edge 31 of rear pad 29 was slanted or skewed at an angle of approximately 20 degrees relative to trailing edge 33. This slider was tested on a disk having a conventional amorphous carbon overcoat and a lubricant film of approximately 40 Angstroms of Denmum SP. The ID velocity was 4.4 m/sec with a skew of −6.7 degrees, and the OD velocity was 9.5 m/sec with a +14 degree skew angle. The suspension preload was 5 gm. Under these conditions, the slider-disk spacing (the spacing between the top of the disk carbon overcoat and the bottom of rear pad 29) was approximately 100 Angstroms at the ID and 150 Angstroms at the OD. Measurements of the drag force on the slider indicated that it dropped from a relatively high value to an essentially constant relatively low value at a velocity of approximately 3.5 m/sec, which is the approximate velocity at which the rear pad 29 is making minimal contact with the lubricant film. Because the disk 16 is not perfectly smooth but has a peak-to-peak waviness within the range of the designed flying height, it is believed that the rear pad 29 is at least partially contacting the lubricant film 50 up until approximately 7 m/sec, at which point the air bearing is fully supporting the rear pad 29. Based on correlations of drag force with flying height, it is estimated that during the period the rear pad 29 is in contact with the lubricant film 50, the air bearing generated beneath pad 29 due to its positive pitch and ion-milled step taper provides approximately 90% of the support for the rear half of slider 20. The designed flying height is controlled by the width of the rear pad 29. For example, decreasing this width by 60 microns, while maintaining all other parameters the same, caused the drag profile to flatten out at approximately 5.5 m/sec rather than 3.5 m/sec. The fact that lift is concentrated over small areas of the slider, compared to conventional sliders where it is distributed over essentially the whole slider surface, makes the slider substantially insensitive to manufacturing tolerances, especially tolerances for crown and camber.

The slider design of the present invention enables the slider to function in both the air-bearing and contact head-disk interface regimes. While the slider provides an extremely low-flying height air-bearing support over a substantial part of the disk, the unique design, particularly the design of the rear pad, enables the slider to also be in contact and near contact with the lubricant film on the disk without deleterious effects. The result is a low-flying height disk drive which can also operate in the contact and near-contact regimes, yet without the disadvantages presented by conventional liquid bearings.

Method of Manufacturing the Slider

The preferred method of manufacturing the slider will be described with reference to FIGS. 5A–5E, which illustrate the steps of manufacturing the slider depicted in FIGS. 3 and 4. FIGS. 5A–5E are sectional views of the slider taken through a section intersecting the front air-bearing pad 27.

Figure 5A:
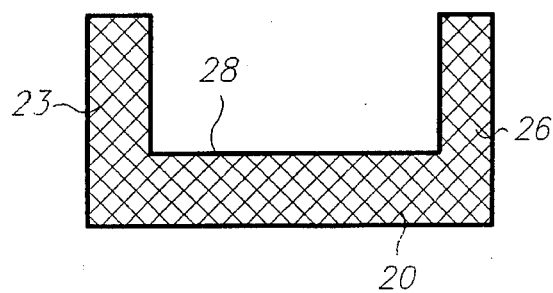
FIGS. 5A–5E are sectional views of the slider illustrating sequential steps in its fabrication.
Figure 5B:
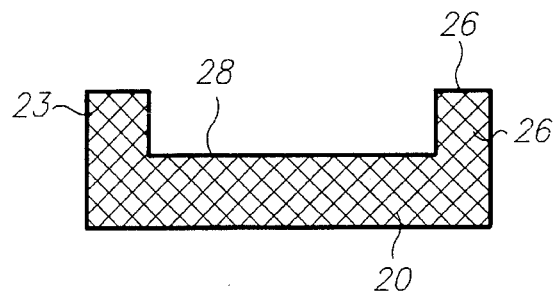
Figure 5C:
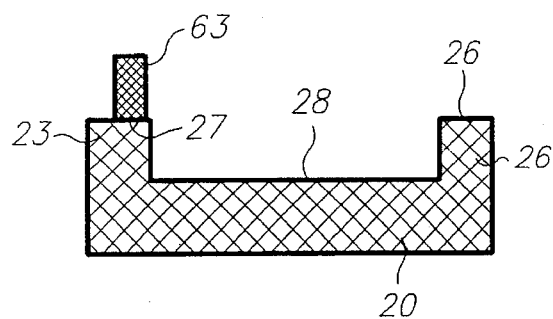
Figure 5D:
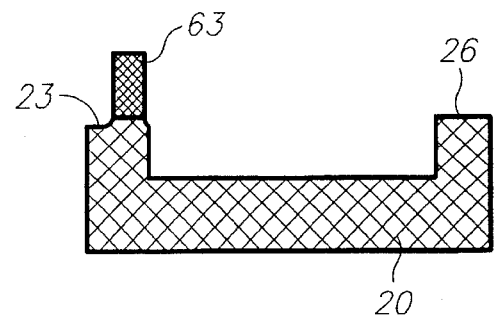
Figure 5E:
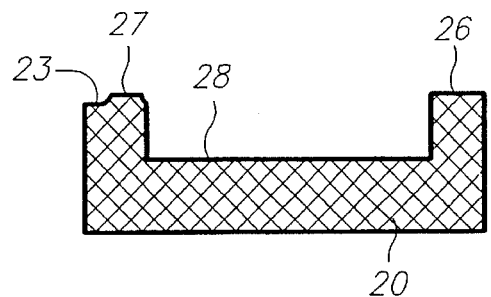

In FIG. 5A the body of the slider 20, which is typically formed of a conventional ceramic mixture of titanium carbide (TIC) and alumina ($Al_2O_3$), has been saw cut to remove its central portion and thereby define the center nonair-bearing surface 28, which separates front ridge section 23 from rear ridge section 26. The depth of the cut can be in the range of 10–100 microns. (As is known in the art, the sliders are processed in rows and then cut into individual sliders, so that FIG. 5A is actually the end view of a row of sliders.) Next, as shown in FIG. 5B, the ends of the ridge sections 23, 26 are rough lapped and polished to the correct height for the transducer 42 (FIG. 4) to be formed later. A layer of photoresist 63, such as Riston brand of poly methylmethacralate (PMMA), is then deposited on top of the ridge sections 23, 26 to a thickness of approximately 0.1 millimeters. The photoresist is then exposed through a suitable mask which defines a pattern corresponding to the air-bearing pads, including pad 27, as shown in FIG. 5C. (Front pad 25 and rear pad 29 are also formed at this time but are not shown in FIG. 5C because it is a sectional view only through front pad 27.) The row of sliders is then ion milled or otherwise etched to the desired depth, e.g., 0.2 microns, to build the air-bearing pads, as shown in FIG. 5D. The photoresist is then removed (FIG. 5E) and the row of sliders cut into the individual sliders.

The design of the slider according to the present invention enables a manufacturing process which is simplified over the process for manufacturing conventional air-bearing sliders of the type having air-bearing rails. Because there are no rails with their typically complex geometries, it is not necessary to use reactive ion etching or other complex steps to remove material from the center of the slider body. Instead, a single and much simpler saw cut is used to define the parallel ridge sections 23, 26. Also, as can best be seen in FIG. 4, all of the air-bearing pads are coplanar and are thus formed by a single photoresist process step.

Alternative Embodiments

Figure 6:
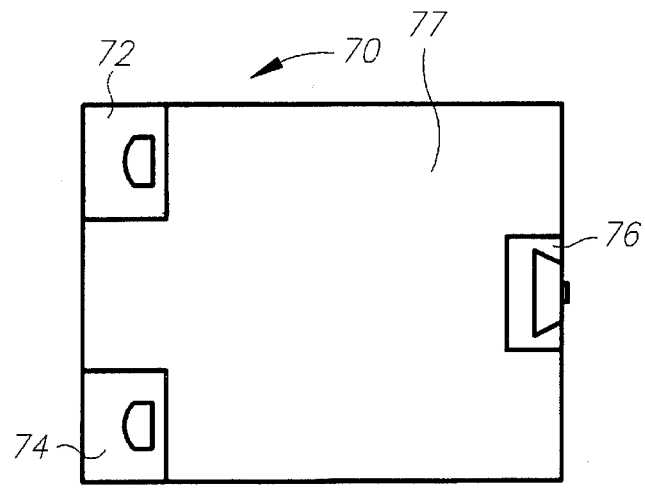
FIGS. 6, 7, and 8 are plan views of the disk sides of alternative embodiments of the slider according to the present invention.

An alternative embodiment of the slider is illustrated in FIG. 6. The alternative slider 70 is similar to slider 20 (FIG. 3) except that the front ridge section comprises two laterally spaced-apart ridge areas 72, 74, and the rear ridge section 76 does not extend across the entire width of the slider 70. The slider 70 is used when the desired material removal step for the central part of the slider is by reactive ion etching (RIE), rather than the saw cut for the embodiment of FIG. 3. The whole area, including the area between ridge areas 72, 74 and the areas on the sides of ridge section 76, can be removed in a single RIE step, resulting in the central nonair-bearing region 77 separating ridge areas 72, 74 from ridge section 76.

Figure 7:
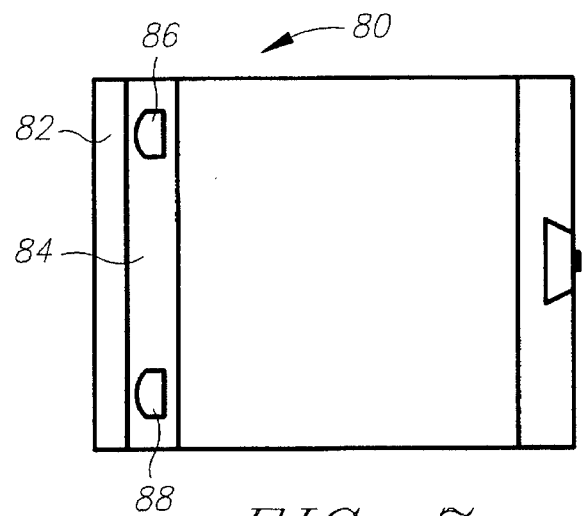

The embodiment of slider 80 shown in FIG. 7 is identical to that of slider 20 of FIG. 3, with the exception that a taper 82 is added to the front of ridge section 84 to improve the pitch and to better direct the air beneath front pads 86, 88. The taper 82 is lapped at an angle relative to the flat surface of ridge section 84, and requires an additional processing step during manufacture.

Figure 8:
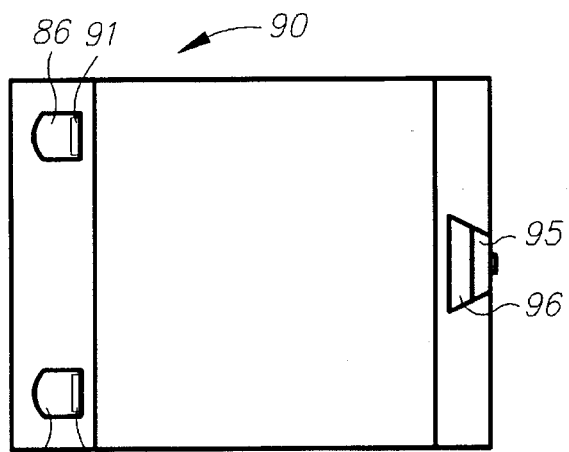

The embodiment of slider 90 in FIG. 8 has front struts 91, 92 that extend from front air-bearing pads 93, 94, respectively, and a rear strut 95 that extends from rear air-bearing pad 96. The struts 91, 92, 95 extend out from their respective pads a distance of approximately 500 to 1500 Angstroms, which is sufficient to support the pads out of contact with the lubricant film, thereby minimizing the static friction and low-velocity drag of the slider 90 during start up of the disk drive when the slider 90 is in contact with the disk. In the manufacture of the slider 90, a first ion-milling step is required to form the struts 91, 92, 95, followed by a second ion-milling step to form the air-bearing pads 93, 94, 96 around their respective struts. The front struts 91, 92 can be formed to have a greater thickness, by deposition of material, than the rear strut 95 so that the slider 90 has a positive pitch up when at rest on the disk. The struts, as well as the air-bearing pads around them, provide lift in the front and rear.

The slider embodiments shown in FIGS. 4, 6, 7, and 8 can also include an amorphous carbon film, as is known in the art for use on slider air-bearing surfaces, which is deposited on the entire front portion of the slider to a suitable thickness, e.g., 2000 Angstroms. The carbon film has the effect of jacking up the front part of the slider when the slider is at rest on the disk to thereby minimize the amount of pad surface area that is in contact with the disk and/or the lubricant. Since the carbon film is only on the front portion of the slider, it results in a reduction in stiction without otherwise affecting the performance of the slider. In this embodiment, the front pads are not coplanar with the rear pad.

The struts in FIG. 8 and the carbon film on the front portion of the carrier improve the performance of the drive in both CSS disk drives and in L/UL disk drives in the event of a failure of the L/UL system. In both cases, the struts and the carbon film raise up the carrier above the lubricant film when the carrier is on the disk and the disk drive is not operating.

Embodiments With Rectangularly Shaped Rear Pad

Figure 9:
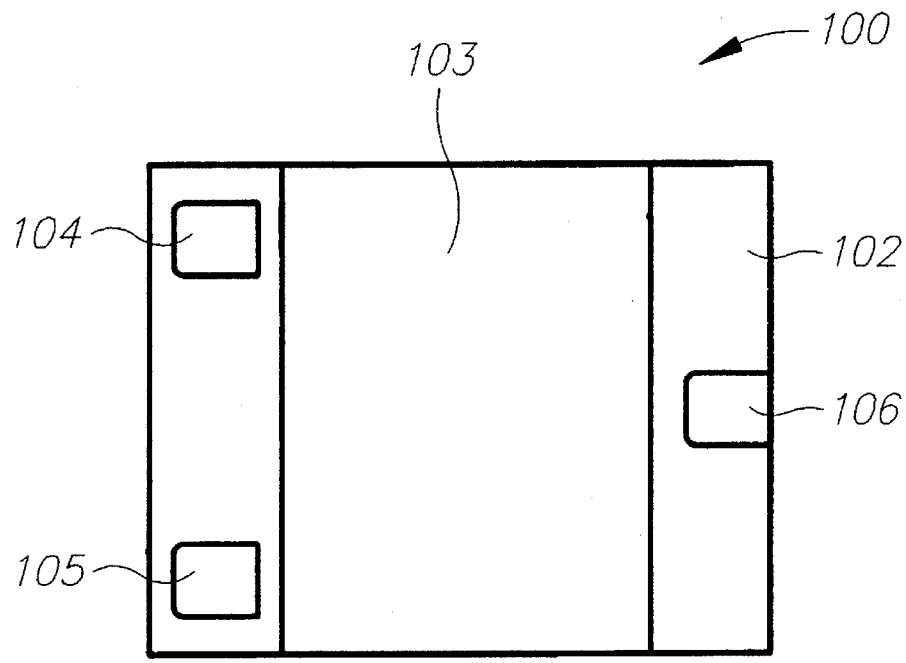
FIG. 9 is a plan view of the disk side of the slider with a generally rectangularly shaped rear pad.

Referring now to FIG. 9, the embodiment of slider 100 is substantially identical in design and operation to that of slider 20 in FIGS. 3 and 4 and shows a rear pad 106 that is generally rectangularly shaped. Slider 100 has a front ridge section 101, a rear ridge section 102 and a nonair-bearing surface 103 separating the two ridge sections 101, 102. Front pads 104, 105 are located on front ridge section 101. The slider of the present invention is fully operable without the specific shape of the rear pad with a wider leading edge and/or skewed leading edge as shown in the slider embodiment of FIG. 3. The wider leading edge and/or skewed leading edge of the rear pad provide additional advantages, especially in an environment where there is a high skew at ID and OD, as described with respect to FIG. 3. However, it is essentially the width and surface area of the rear pad, not the shape of its leading edge, that determines the flyability of the slider. The rear pad 106 has its leading edge generally the same width as its trailing edge.

Slider 100 has been shown through mathematical modeling to provide any desired flying height in the range of approximately 1–2 micro-inches (250–500 Angstroms). In this modeling the slider had length and width dimensions of 2.5 mm and 1.6 mm, respectively, and the front pads 104, 105 were 0.35 mm long by 0.25 mm wide. The rear pads that were modeled had a length of 0.25 mm and widths that ranged between 0.24–0.40 mm, the various widths determining the desired flying height. The three pads 104, 105, 106 were coplanar and raised above their respective ridge sections by approximately 1600 Angstroms. The slider 100 had a gram loading of 6 grams. The disk was a 2.5 in.

diameter disk rotated at 4000 RPM. Under these conditions the flying height variations were 250–280 Angstroms from ID to OD for the 1 micro-inch design flying height, and 510–550 Angstroms from ID to OD for the 2 micro-inch design flying height.

Figure 10:
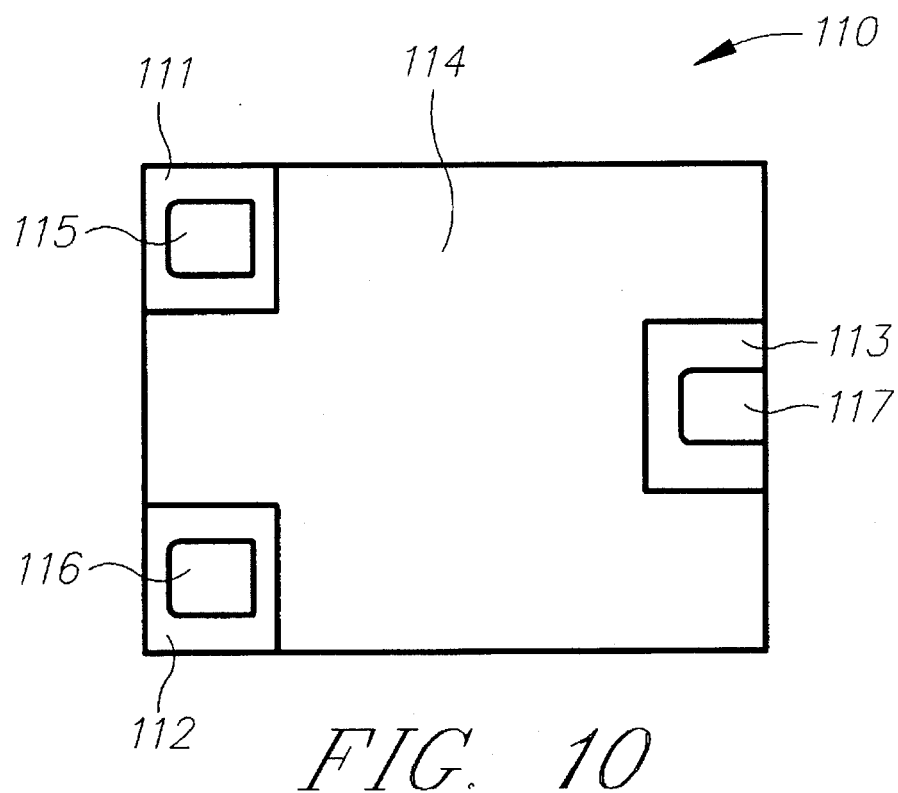
FIG. 10 is a plan view of the disk side of the slider with a generally rectangularly shaped rear pad and illustrates the embodiment where the front ridge section is formed as a pair of laterally spaced-apart ridge areas and the rear ridge section extends less than the full width of the slider.

In addition to this good flying height flatness, the sliders of FIGS. 9–10, as well as the previously described embodiments, all have relatively low sensitivity to manufacturing tolerances, especially those that determine the overall shape of the slider. A crown variation (defined as the height of the longitudinal centerline of the ABS of the slider above the front and back edges when a parabola is fitted to the front and back topography) of +/−450 Angstroms causes only a flying height variation of +/−8 Angstroms for a nominal 250 Angstroms flying height and 10 Angstroms for a nominal 500 Angstroms flying height. This is a factor of approximately 3–5 times lower crown variation sensitivity than for conventional sliders. This improved low sensitivity to slider crown variation is due to the fact that the ABS support is provided by the three localized pads on the front and rear ridge sections, rather than the complete topography of the bottom of the slider.

Because the rear pad is generally rectangularly shaped and located along the slider's longitudinal centerline it is symmetric about the longitudinal centerline. Thus the same slider design can be used on both sides of the magnetic recording disk. Thus only one part need be manufactured. This simplifies manufacturing of the slider and assembly of the disk drive. This is in contrast to the slider having the rear pad with the skewed leading edge, i.e., slider 20 in FIG. 3, which is designed to give flying height uniformity from ID to OD when the slider is highly skewed at both the ID and OD.

FIG. 10 illustrates a slider 110 having a generally rectangularly shaped rear pad 117 but wherein the front ridge section comprises two laterally spaced-apart ridge areas 111, 112. Also the rear ridge section 113 extends less than the full width of slider 110. Nonair-bearing surface 114 separates the ridge areas 111, 112 from rear ridge section 113. Slider 110 is thus substantially identical to slider 70 shown in FIG. 6.

The front and rear pads in both sliders 100, 110 can have generally convexly shaped or curved leading edges or generally flat leading edges with rounded corners connecting the leading edges, as shown in FIGS. 9–10. The sliders 100, 110 can also include the additional features shown and described with respect to FIGS. 7–8.

While the preferred embodiments of the present invention have been illustrated in detail, it should be apparent that modifications and improvements may be made to the invention without departing from the spirit and scope of the invention as described in the following claims.

What is claimed is:

1. A magnetic recording disk drive comprising:

at least one magnetic recording disk having a lubricant film thereon;

a motor connected to the disk for rotating the disk;

a slider having a disk side, a side opposite the disk side, a front ridge section generally transverse to the slider longitudinal centerline and supporting two front air-bearing pads generally equally spaced about the slider longitudinal centerline, a rear ridge section generally parallel to the front ridge section and supporting a generally rectangularly shaped rear air-bearing pad located on the slider longitudinal centerline, and a nonair-bearing surface recessed from and separating the front and rear ridge sections, the total surface area of the front air-bearing pads being greater than the surface area of the rear air-bearing pad, whereby the slider is pitched up during operation of the disk drive;

a magnetic head located on the slider near the rear air-bearing pad for reading data from or writing data to the disk;

an actuator for moving the slider generally radially across the disk so the head may access different regions of data on the disk;

a suspension attached to the side of the slider opposite the disk side and connecting the slider to the actuator for maintaining the air-bearing pads of the slider near the disk during operation of the disk drive; and means for supporting the motor and actuator.

2. The disk drive according to claim 1 wherein each of the pads has a length-to-width ratio of between approximately 0.25 and 2.

3. The disk drive according to claim 1 wherein the air-bearing surfaces of all the pads are substantially coplanar.

4. The disk drive according to claim 1 wherein each of the front air-bearing pads has a leading edge having an essentially convex curvature.

5. The disk drive according to claim 1 wherein the front ridge section includes a tapered surface.

6. The disk drive according to claim 1 wherein the rear air-bearing pad is generally symmetric about the slider longitudinal centerline.

7. The disk drive according to claim 1 wherein the rear air-bearing pad has a leading edge having an essentially convex curvature.

8. The disk drive according to claim 1 wherein the front ridge section includes a pair of laterally spaced-apart ridge areas, each ridge area supporting an air-bearing pad.

9. The disk drive according to claim 1 wherein the rear ridge section is generally symmetric about the slider longitudinal centerline and has a width less than the width of the slider.

10. The disk drive according to claim 1 further comprising means attached to the motor and actuator supporting means for unloading the slider from the disk when the disk drive is not operating.

11. A transducer assembly for a magnetic recording disk drive having a disk with a lubricant film thereon, the assembly comprising:

a slider having a disk side, a side opposite the disk side, a front ridge section generally transverse to the slider longitudinal centerline and supporting two front air-bearing pads generally equally spaced about the slider longitudinal centerline, a rear ridge section generally parallel to the front ridge section and supporting a generally rectangularly shaped rear air-bearing pad located on and being generally symmetric about the slider longitudinal centerline, and a nonair-bearing surface recessed from and separating the front and rear ridge sections, the total surface area of the front air-bearing pads being greater than the surface area of the rear air-bearing pad; and a magnetic head located on the slider near the rear air-bearing pad for reading data from or writing data to the disk, whereby when the assembly is located in an operating disk drive the differential surface area between the front and rear air-bearing pads pitches the slider up.

12. The transducer assembly according to claim 11 wherein the length-to-width ratio of the front pad is between approximately 0.25 and 2.

13. The transducer assembly according to claim 11 wherein the air-bearing surfaces of all the pads are substantially coplanar.

14. The transducer assembly according to claim 11 wherein the front air-bearing pad has a leading edge having an essentially convex curvature.

15. The transducer assembly according to claim 11 wherein the rear air-bearing pad has a leading edge having an essentially convex curvature.

16. The transducer assembly according to claim 11 wherein the front ridge section includes a tapered surface.

17. The transducer assembly according to claim 11 wherein the front ridge section includes a pair of laterally spaced-apart ridge areas, each ridge area supporting an air-bearing pad.

18. The transducer assembly according to claim 11 wherein the rear ridge section is generally symmetric about the slider longitudinal centerline and has a width less than the width of the slider.

19. The transducer assembly according to claim 11 further comprising means for connecting the slider to the actuator of the disk drive, the slider-to-actuator connecting means including means for biasing the slider toward the disk.

20. A transducer assembly for a magnetic recording disk drive having a disk with a lubricant film thereon, the assembly comprising:

a slider having a disk side, a side opposite the disk side, a front ridge section generally transverse to the slider longitudinal centerline and supporting two front air-bearing pads generally equally spaced about the slider longitudinal centerline, a rear ridge section generally parallel to the front ridge section and supporting a rear air-bearing pad located on the slider longitudinal centerline and having a leading edge with an essentially convex curvature, and a nonair-bearing surface recessed from and separating the front and rear ridge sections, the total surface area of the front air-bearing pads being greater than the surface area of the rear air-bearing pad; and a magnetic head located on the slider near the rear air-bearing pad for reading data from or writing data to the disk, whereby when the assembly is located in an operating disk drive the differential surface area between the front and rear air-bearing pads pitches the slider up.

* * * * *

UNITED STATES PATENT AND TRADEMARK OFFICE
CERTIFICATE OF CORRECTION

PATENT NO. : 5,499,149
DATED : March 12, 1996
INVENTOR(S) : Moris M. Dovek

It is certified that error appears in the above-indentified patent and that said Letters Patent is hereby corrected as shown below:

Column 1, line 31, "tides" should read --rides--;
"beating" should read --bearing--.

line 41, "beating" should read --bearing--.

line 47, "beating" should read --bearing--.

Signed and Sealed this

Twenty-eighth Day of May, 1996

Attest:

BRUCE LEHMAN

*Attesting Officer*  *Commissioner of Patents and Trademarks*